US012115775B2

(12) United States Patent
Asai et al.

(10) Patent No.: US 12,115,775 B2
(45) Date of Patent: Oct. 15, 2024

(54) RECORDING APPARATUS HAVING FLEXIBLE RECORDING MEDIUM RECEIVING MEMBER

(71) Applicant: CANON KABUSHIKI KAISHA, Tokyo (JP)

(72) Inventors: Yasuyuki Asai, Tokyo (JP); Hideyuki Nozawa, Tochigi (JP); Hiromasa Yoneyama, Kanagawa (JP); Kota Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,022

(22) Filed: Jul. 5, 2023

(65) Prior Publication Data

US 2023/0347665 A1 Nov. 2, 2023

Related U.S. Application Data

(63) Continuation of application No. 17/480,604, filed on Sep. 21, 2021, now Pat. No. 11,731,436.

(30) Foreign Application Priority Data

Sep. 30, 2020 (JP) ................................ 2020-166128

(51) Int. Cl.
*B41J 11/00* (2006.01)
*B41J 13/10* (2006.01)
(Continued)

(52) U.S. Cl.
CPC ......... *B41J 11/0045* (2013.01); *B41J 13/106* (2013.01); *B41J 13/10* (2013.01); *B65H 31/00* (2013.01); *B65H 31/22* (2013.01)

(58) Field of Classification Search
CPC ...... B41J 11/0045; B41J 13/106; B41J 13/10; B65H 31/00; B65H 31/22
See application file for complete search history.

(56) References Cited

U.S. PATENT DOCUMENTS 5,012,295 A 4/1991 Ikkatai et al.
9,002,257 B2 4/2015 Saiga
(Continued)

FOREIGN PATENT DOCUMENTS

JP 60-204569 A 10/1985
JP 8-133557 A 5/1996
(Continued)

OTHER PUBLICATIONS

Office Action dated Aug. 20, 2024, in Japanese Patent Application No. 2020-166128.

*Primary Examiner* — Henok D Legesse
(74) *Attorney, Agent, or Firm* — Venable LLP

(57) ABSTRACT

A recording apparatus includes a recording portion configured to record an image on a recording medium; a housing having an ejection opening on the side of the housing, the recording medium recorded with the image being ejected from the ejection opening in the ejection direction; and a receiver that receives the recording medium ejected from the ejection opening. The recording apparatus further includes a guide provided inside the ejection opening of the housing, and the receiver has an end on an upstream side of the receiver with respect to the ejection direction such that the end is held at a position overlapping with the guide.

12 Claims, 13 Drawing Sheets

(51) Int. Cl.
*B65H 31/00* (2006.01)
*B65H 31/22* (2006.01)

(56) References Cited

U.S. PATENT DOCUMENTS

| | | | | |
|---|---|---|---|---|
| 9,272,872 | B2 | 3/2016 | Sugiyama et al. | |
| 9,809,407 | B2 | 11/2017 | Anayama et al. | |
| 10,457,516 | B2 | 10/2019 | Ohashi et al. | |
| 10,906,764 | B2 | 2/2021 | Yoneyama et al. | |
| 10,967,658 | B2 | 4/2021 | Yoneyama et al. | |
| 11,122,175 | B2 | 9/2021 | Ohashi et al. | |
| 11,130,648 | B2 | 9/2021 | Asai et al. | |
| 2002/0054183 | A1* | 5/2002 | Kanaya | B41J 2/16526<br>347/23 |
| 2015/0273897 | A1* | 10/2015 | Kato | B65H 29/26<br>347/104 |
| 2018/0244086 | A1* | 8/2018 | Yoneyama | B41J 15/046 |
| 2021/0191297 | A1 | 6/2021 | Yamaguchi et al. | |
| 2022/0097425 | A1* | 3/2022 | Yoneyama | B41J 13/106 |

FOREIGN PATENT DOCUMENTS

| | | | |
|---|---|---|---|
| JP | 2013-060001 | A | 4/2013 |
| JP | 5966574 | B2 | 8/2016 |
| JP | 2017-065840 | A | 4/2017 |

* cited by examiner 110
112
114
114a
114b
140
141
141a
141b
TOP
BOTTOM
LEFT
RIGHT
FRONT (FRONTWARD)
REAR (REARWARD)

ENLARGED VIEW AROUND SHEET OUTLET

RECORDING APPARATUS HAVING FLEXIBLE RECORDING MEDIUM RECEIVING MEMBER

BACKGROUND OF THE INVENTION

Field of the Invention

The present invention relates to a recording apparatus including a storing device for storing a sheet recording medium with a recorded image.

Description of the Related Art

A recording apparatus including a sheet storing portion for storing sheets serving as recording media with recorded (printed) images is conventionally known. Japanese Patent No. 5966574 discloses an apparatus configuration including a storing portion for storing a roll sheet to be fed into an image recording portion before images are recorded on the sheet, in which an ejected-sheet storing portion (basket) is provided in front of a roll cover disposed over the roll-sheet storing portion.

SUMMARY OF THE INVENTION

Unfortunately, in the apparatus of Japanese Patent No. 5966574, the roll cover serves as a sheet-path surface and thus a sheet, which is easily curled, may roll up on the roll cover and bring a print surface (image recording surface) into contact with the roll cover. This may cause a scratch, which should be avoided.

The present invention provides a recording apparatus that can suppress the occurrence of scratches on a recording medium to be ejected.

In order to solve the problem, the recording apparatus of the present invention includes:

a recording portion configured to record an image on a recording medium;

a housing having an ejection opening on a side of the housing, the recording medium recorded with the image being ejected from the ejection opening in an ejection direction; and a receiver that receives the recording medium ejected from the ejection opening, wherein the recording apparatus includes a first guide that is provided inside the ejection opening of the housing and supports the recording medium, and wherein the receiver has a first end being on an upstream side of the receiver in the ejection direction such that the first end is held at a position under the first guide so as to overlap with the first guide in the ejection direction.

The present invention can suppress the occurrence of scratches on a recording medium to be ejected.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

Embodiment 1

Referring to FIGS. 1A to 1C, 2A to 2E, 3, 4A to 4D, 5A, 5B, and 6A to 6C, a recording apparatus according to Embodiment 1 of the present invention will be described below. The recording apparatus of the present embodiment is an inkjet printing apparatus including a sheet conveyor for conveying a sheet as a recording medium, a recording portion for recording an image on the sheet, and a sheet-ejecting portion for ejecting the sheet to the front portion of the apparatus. The recording apparatus of the present embodiment is a liquid-ejecting recording apparatus that ejects liquids such as ink onto a recording medium. The kind of image recording is not limited to a specific method. For example, the present invention is also applicable to a recording apparatus of an electrophotographic system.

Figure 1A:
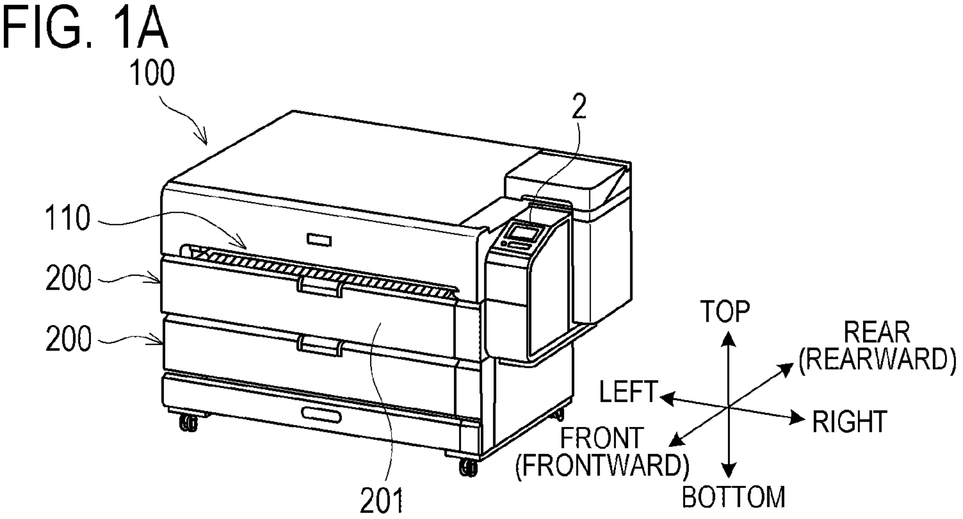
FIGS. 1A to 1C are explanatory drawings illustrating a configuration of a recording apparatus according to Embodiment 1 of the present invention.
Figure 1B:
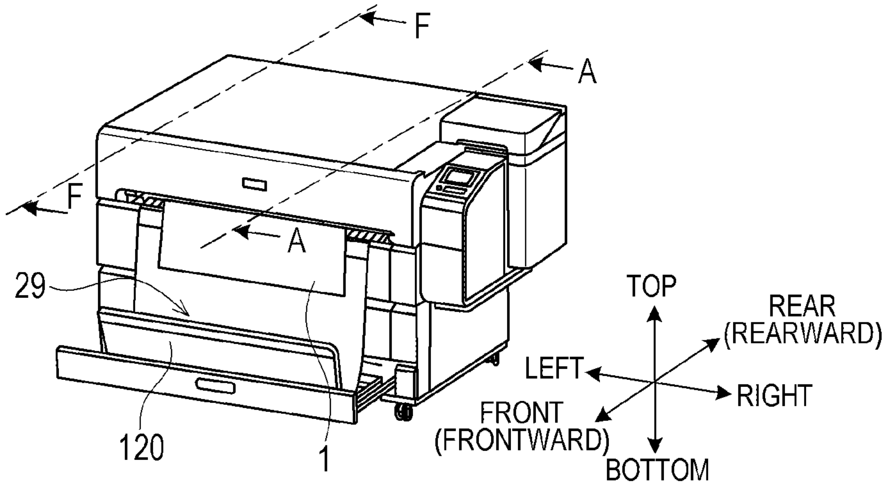

FIGS. 1A and 1B are perspective views illustrating a schematic configuration of a recording apparatus (hereinafter referred to as a printing apparatus) 100 that accommodates two roll sheets 1 that are wound as sheet recording media. FIG. 1B illustrates a sheet being ejected from the front of the recording apparatus. An image is printed on the sheet 1 selectively drawn from the two roll sheets that are set in vertically disposed sheet conveyors 200. The sheet 1 with the printed image is ejected from a front ejection-guide portion 110 provided at the front of the printing apparatus. A user can specify the size of the sheet 1, switch on-line/off-line, and input various commands for the printing apparatus 100 by using various switches provided for an operation panel 2.

Figure 1C:
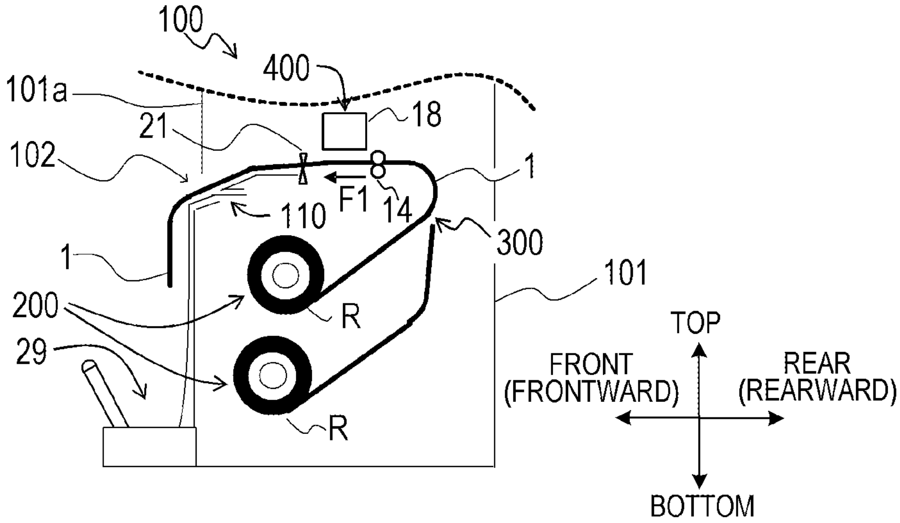

FIG. 1C is a schematic cross-sectional view (taken along line A-A of FIG. 1B) of the principal part of the printing apparatus 100 when the sheet is ejected from the front. The two sheet conveyors 200 for two rolls R are vertically disposed. The sheet 1 drawn from the roll R by the conveyor 200 is conveyed to an image recording portion (hereinafter referred to as a print portion) 400, which can print images, by a sheet conveying portion (conveying mechanism) 300 along a sheet conveying path. The print portion 400 prints an image on the sheet 1 by ejecting ink from an inkjet print head 18. The print head 18 ejects ink from an outlet by using ejection-energy generating elements such as an electrothermal conversion element (heater) and a piezoelectric element. The print head 18 is not limited to an inkjet type. Moreover, the print method of the print portion 400 is not limited and may be, for example, serial scanning or full-line printing. In the case of serial scanning, an image is printed while the sheet 1 is conveyed and the print head 18 scans in a direction crossing the conveying direction of the sheet 1. In the case of full-line printing, by using the long print head 18 extended in the direction crossing the conveying direction of the sheet 1, images are printed while the sheets 1 are consecutively conveyed.

The sheet 1 guided to the print portion 400 is conveyed in a conveying direction F1 by a conveying roller pair 14. A cutter 21 and the front ejection-guide portion 110 are sequentially disposed downstream of the print head 18 in the conveying direction F1. The sheet 1 passes over the front ejection-guide portion 110 and is ejected from the front of the printing apparatus. After the completion of the print, the sheet 1 cut by the cutter 21 is ejected by the weight of the sheet and is stored in a front ejected-sheet storing portion 29 that can be drawn from the lower portion of the printing apparatus. The printing apparatus 100 has an ejection opening 102 on a side 101*a* at the printing apparatus front-side of a housing 101. The front ejected-sheet storing portion 29 is disposed below the ejection opening 102 so as to receive the sheet 1 ejected from the ejection opening 102.

Figure 2A:
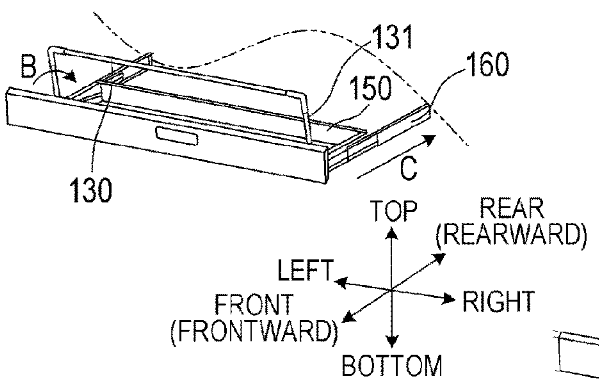
FIGS. 2A to 2E are explanatory drawings illustrating a configuration of a sheet storing device according to Embodiment 1 of the present invention.
Figure 2B:
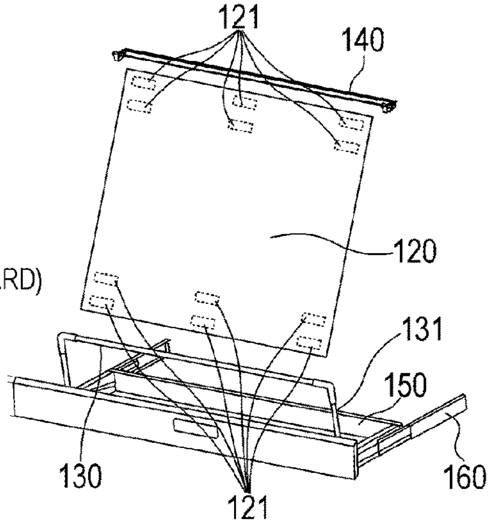
Figure 2C:
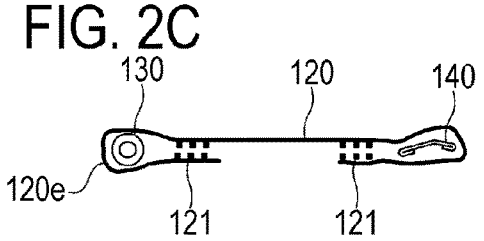
Figure 2D:
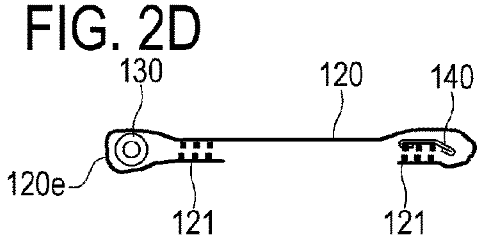
Figure 2E:
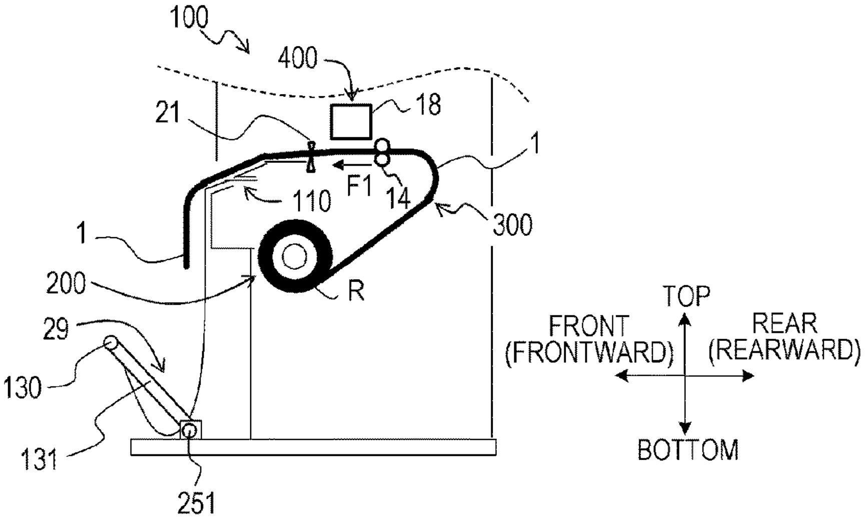

Referring to FIGS. 2A to 2E, the detail of the front ejected-sheet storing portion 29 will be described below. FIGS. 2A to 2E are configuration explanatory drawings of a sheet storing device according to Embodiment 1. FIG. 2A is a perspective view, FIG. 2B is a configuration explanatory drawing of a basket cloth 120, FIGS. 2C and 2D are explanatory drawings of a configuration that holds the basket cloth 120, and FIG. 2E is another schematic diagram of the sheet storing device. In FIG. 2A, the printing apparatus 100 of FIG. 1B is not partially illustrated. The front ejected-sheet storing portion 29 includes a polyester sheet member (hereinafter referred to as a basket cloth) 120 serving as a receiver, and a first holder 130 and a second holder 140 that support the basket cloth 120. The first holder 130 supports one end 120*e* (end side) of the basket cloth 120 on the downstream side in the ejection direction of the sheet 1, below the ejection opening 102 in the vertical direction and at a predetermined distance from the side 101*a* in the horizontal direction, the side 101*a* having the ejection opening 102. The distance between the first holder 130 and the side 101*a* is optionally set so as to properly receive the ejected sheet 1. The distance may be changed according to, for example, the length, the material, and the number of ejected sheets 1. The second holder 140 is configured to support the basket cloth near the printing apparatus 100 relative to the first holder 130. The detail will be described later.

The front ejected-sheet storing portion 29 further includes a drawer portion 150 disposed below the sheet conveyors 200 at the bottom of the printing apparatus main body, and side rods 131 supporting the first holder 130 with respect to the drawer portion 150. The side rods 131 connect both ends of the first holder 130 to the drawer portion 150 and are supported so as to pivot, with respect to the drawer portion 150, from an upright position in FIG. 2A to a position where the distal-end sides (near the first holder 130) are laid toward the back side of the printing apparatus. The drawer portion 150 can be moved from the state of FIG. 2A in the direction of an arrow C (a direction from the front side toward the back side) by rails 160 with respect to the printing apparatus 100. The drawer portion 150 serving as a storing portion of the front ejected-sheet storing portion 29 is configured so as to store the first holder 130 and the side rods 131 in a laid position and the basket cloth 120 that is stored in a folded or rounded position after being removed from the printing apparatus 100. Thus, if the basket cloth 120 is not used, the front ejected-sheet storing portion 29 can place various configurations in the drawer portion 150 and store the configurations in the lower portion of the printing apparatus 100.

FIGS. 2B and 2C illustrate the configuration of the basket cloth 120. The basket cloth 120 is attachable and detachable to and from the first holder 130 and the second holder 140. The basket cloth 120 of the present example has at least one hook and loop fastener 121 in the width direction of the sheet 1. A user wraps the basket cloth 120 around the two holders and joins the hook and loop fastener 121 at a site. Specifically, one end side of the basket cloth 120 is folded around the outer surface of the first holder 130 shaped like a pipe or a shaft, and then the back sides of a sheet receiving surface are joined to each other near the one end by the hook and loop fastener 121. Moreover, the other end side of the basket cloth 120 is folded around the outer surface of the second holder 140 shaped like a long plate, and then the back sides of the sheet receiving surface are joined to each other near the other end by the hook and loop fastener 121. The detail will be described later.

The hook and loop fastener is not always provided on the basket cloth 120. For example, the second holder 140 may have the hook and loop fastener 121 on the opposite side from the guide surface for the sheet 1 such that the hook and loop fastener 121 on the second holder 140 pairs up with the hook and loop fastener on the basket cloth 120 side (FIG. 2D). In this configuration, the sheet conveyors 200 are placed in two stages and the bottom portion of the configuration is used to provide the front ejected-sheet storing 29, allowing the storage of the first holder 130. The present invention is not limited this configuration.

As illustrated in FIG. 2E, if the printing apparatus has an upper single roller, a space for a lower roller in the printing apparatus 100 may have the side rods 131 pivoting inside and outside the printing apparatus 100 without using the drawer portion 150.

Figure 3:
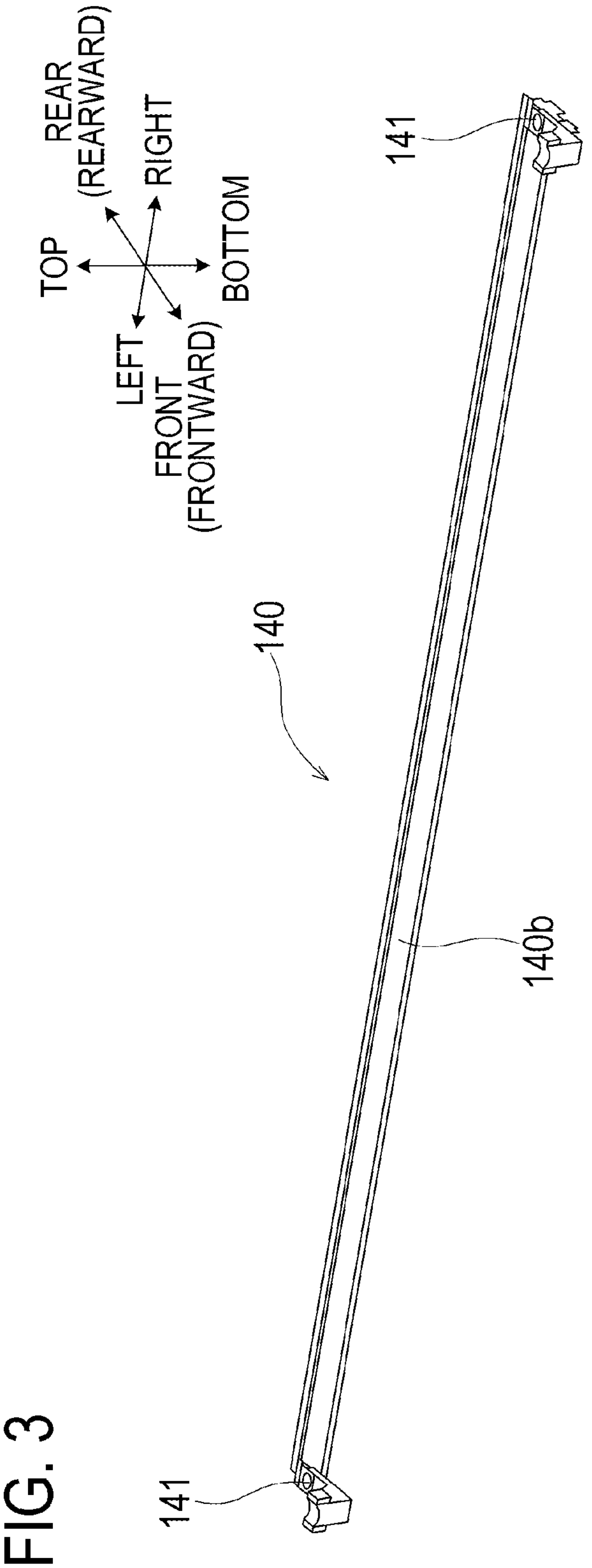
FIG. 3 is a perspective view illustrating a second holder according to Embodiment 1 of the present invention.

Referring to FIG. 3, the configuration of the second holder 140 will be described below. The second holder 140 has positioning members 141 for positioning the basket cloth 120 on both ends of the second holder 140. The two positioning members 141 are attachable and detachable to and from the printing apparatus 100. The detachable positioning members 141 can be removed to another location when the basket cloth 120 is not used.

Figure 4A:
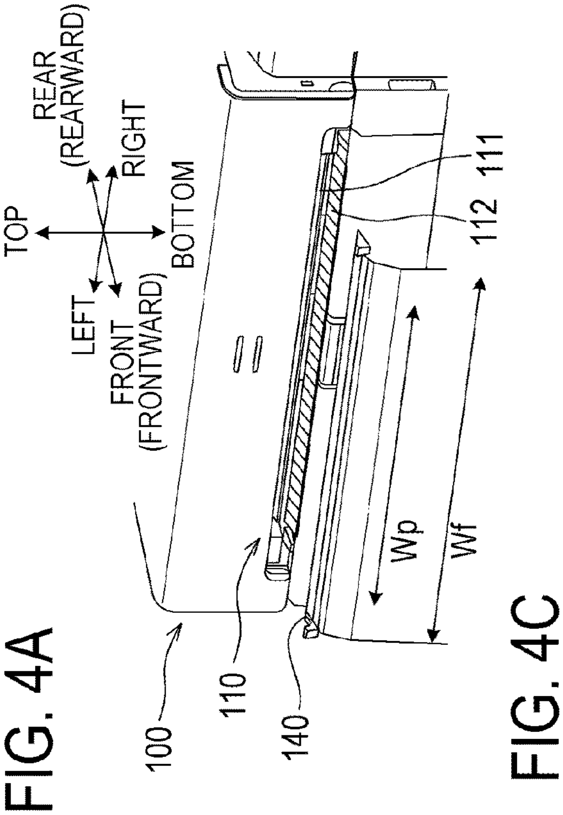
FIGS. 4A to 4D are explanatory drawings illustrating a configuration of the second holder according to Embodiment 1 of the present invention.
Figure 4B:
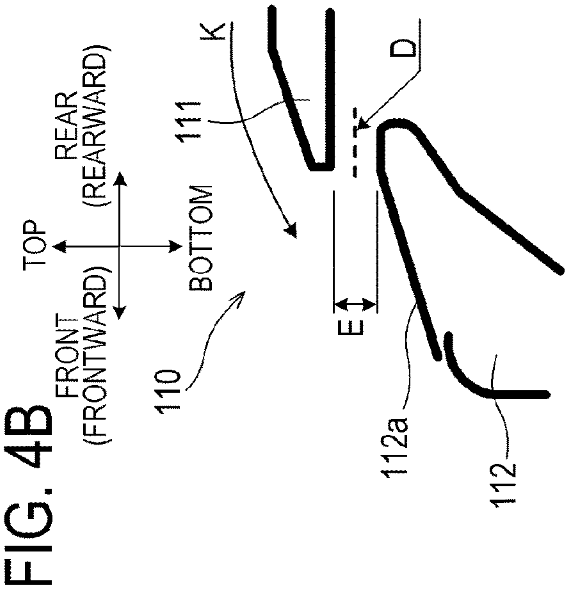
Figure 4C:
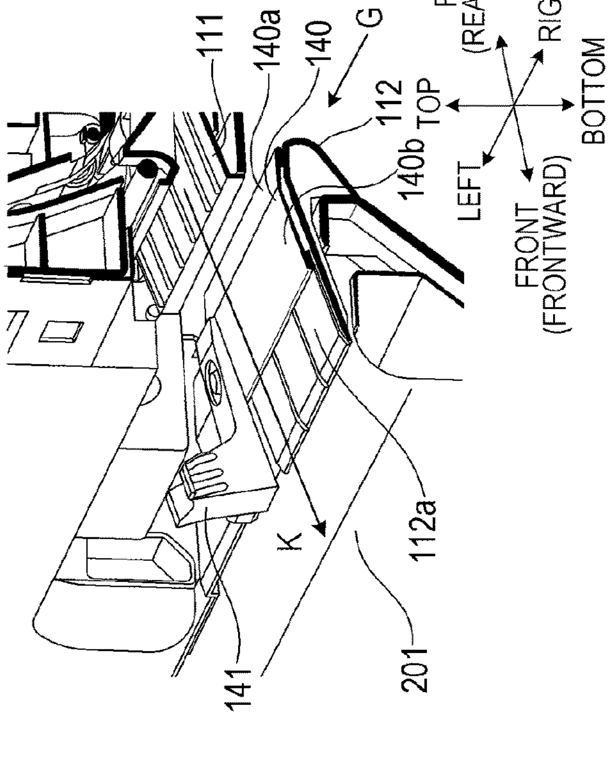
Figure 4D:
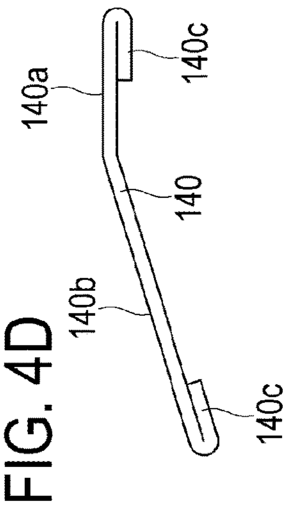
Figure 13:
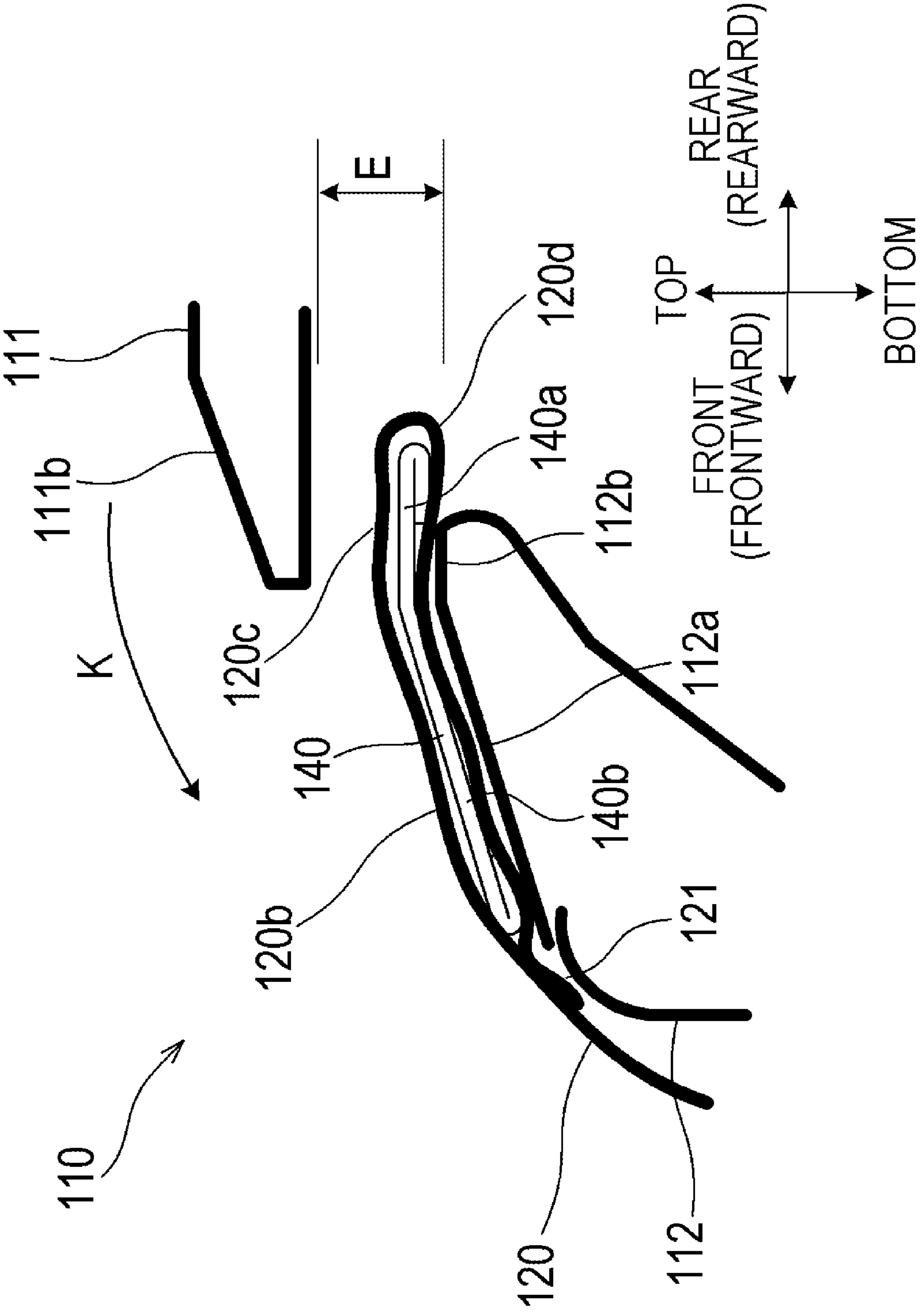
FIG. 13 is an explanatory drawing illustrating the attachment configuration of the basket according to Embodiment 1 of the present invention.

Referring to FIGS. 4A to 4D and 13, a guide configuration with the second holder 140 attached to the printing apparatus 100 will be described below. FIG. 4A is a perspective view illustrating a configuration around an attachment portion (ejection-guide portion 110) before the second holder 140 is attached. FIG. 4B is a schematic side cross-sectional view illustrating the attachment portion before the second holder 140 is attached. FIG. 4C is a partial perspective view illustrating the attachment portion when the second holder 140 is attached. FIG. 4D is a schematic cross-sectional view of the second holder 140. FIG. 13 is a schematic cross-sectional view illustrating the basket cloth 120 and the second holder 140 that are attached to the ejection-guide portion 110. In FIGS. 4A to 4D, for explanatory convenience, the basket cloth 120 is not illustrated. In reality, as described above, the second holder 140 is wrapped with the basket cloth 120.

The front ejection-guide portion 110 includes an upstream ejection guide (upstream-side guide, first guide) 111, and a downstream ejection guide (downstream-side guide, second guide) 112, and the second holder 140 is provided in the ejection opening 102 so as to guide the recorded sheet 1 to the ejection opening 102. In the positional relationship between the underside of the upstream ejection guide 111 and the downstream ejection guide 112, an overlap (broken line D) is made in the horizontal direction while a space E is formed in the vertical direction (perpendicular direction). In other words, the downstream ejection guide 112 is disposed below the upstream ejection guide 111 and is partially superimposed thereon when viewed in the vertical direction. The upstream ejection guide 111 and the downstream ejection guide 112 are separated by a predetermined distance in the vertical direction. A clearance between the guides forms the space E.

The downstream ejection guide 112 overlaps with the upstream ejection guide 111 in the horizontal direction and has an inclined shape (inclined surface) 112*a* such that the ejection guide portion is not entirely horizontal but is inclined downward at a predetermined angle in an ejection direction with respect to the horizontal direction. Specifically, as illustrated in FIG. 13, in a part of the clearance between the downstream ejection guide 112 and the upstream ejection guide 111 to the outside, the inclined surface 112*a* extends diagonally downward to the ejection opening with respect to a horizontal plane. When the basket cloth 120 is attached to the printing apparatus 100, the inclined surface 112*a* serves as a support surface that supports the vicinity of a first end 120*d* of the basket cloth 120 (second holder 140), the first end 120*d* being disposed on the upstream side of the basket cloth 120 in the sheet ejection direction. Also, as illustrated in FIG. 2C, a second end 120*e* of the basket cloth 120 is disposed on the downstream side of the basket cloth 120 in the sheet ejection direction and the second end 120*e* is supported by the first holder 130. When the basket cloth 120 is not used, the inclined surface 112*a* serves as a guide surface that guides a surface opposite to the image recording surface of the sheet 1. In this case, the inclined surface 112*a* forms a second guide surface that is aligned with a guide surface (first guide surface) 111*b* of the upstream ejection guide 111 in the ejection direction of the sheet 1 with the clearance disposed between the surfaces. The second guide surface is provided on a downstream side of the guide surface 111*b* in the ejection direction of the sheet 1. The inclined surface 112*a* is inclined at 17° in the present example. The angle is not limited to a specific angle and is optionally set according to the specifications of the printing apparatus or the kind of sheets.

As illustrated in FIG. 13, an opposed surface 112*b* forming the clearance with the upstream ejection guide 111 on the downstream ejection guide 112 serves as a support surface (first support surface) that supports, with the inclined surface 112*a* (second support surface), the vicinity of the first end 120*d* (second holder 140) of the basket cloth 120. The opposed surface 112*b* is a surface inclined with respect to the inclined surface 112*a* and the guide surface 111*b* so as to extend in a direction that is bent at an acute angle with respect to a direction that extends the inclined surface 112*a* and the guide surface 111*b* of the upstream ejection guide 111 (sheet guide direction). The opposed surface 112*b* allows the clearance between the upstream ejection guide 111 and the downstream ejection guide 112 to extend the space E substantially opposite to the ejection direction of the sheet 1 with respect to the ejection path (conveying path) of the sheet 1. This configuration prevents one end of the sheet 1 from being drawn into the clearance (space E) and caught by the basket cloth 120 (the occurrence of a jam). In the present example, the opposed surface 112*b* extends horizontally. The opposed surface 112*b* may be angled with respect to the horizontal direction if the catch of the end of the sheet 1 can be suppressed. In the printing apparatus configuration of the present example, an angle formed by the opposed surface 112*b* with a horizontal plane is preferably smaller than an angle formed by the inclined surface 112*a* and the guide surface 111*b* with the horizontal plane. This depends on an angle formed by the ejection direction of the sheet 1 with respect to the horizontal plane, so that the configuration is not particularly limited. For example, in the present example, the inclined surface 112*a* and the guide surface 111*b* are parallel to each other. If an angle is formed between the surfaces, the inclined surface 112*a* and the opposed surface 112*b* may be parallel to each other (form a single surface).

As illustrated in FIG. 4C (taken along line F-F in FIG. 1B), the basket cloth 120 has a first set position for attachment to the printing apparatus 100 with the second holder 140 inserted into the space E. At this point, the second holder 140 also has a cross-sectional shape including a horizontal surface 140*a* and an inclined surface 140*b* along the space E and the inclined surface 112*a* when viewed in an arrow direction G. The second holder 140 has hem bending portions 140*c* in the longitudinal direction on the upstream side and the downstream side in the ejection direction. This configuration can achieve compatibility between space savings and strength. As illustrated in FIG. 13, the basket cloth 120 is attached and held such that the first end 120*d* is wrapped around the second holder 140. In the basket cloth 120, a part surrounding a part (first holding portion) including the horizontal surface 140*a* disposed inside the space E on the second holder 140 includes a part forming an opposed surface 120*c* with respect to (the underside of) the upstream ejection guide 111 with the space E disposed therebetween, and a part interposed between the first holding portion and the opposed surface 112*b* of the downstream ejection guide 112. Moreover, in the basket cloth 120, a part surrounding a part (second holding portion) including the inclined surface 140*b* includes a part forming a guide surface (receiver guide surface) 120*b* that guides the ejection of the sheet 1, and a part interposed between the second holding portion and the inclined surface 112*a* of the downstream ejection guide 112. At the first set position, the horizontal surface 140*a* of the second holder 140 overlaps with the underside of the upstream ejection guide 111 in the horizontal direction, thereby preventing the curled sheet 1 from being caught by the basket cloth 120 when the sheet 1 is ejected in the direction of an arrow K.

With this configuration, the first end 120*d* of the basket cloth 120 is held at a position under the upstream ejection guide 111 so as to overlap with the upstream ejection guide 111 in the sheet conveying direction. Furthermore, the end 120*d* is held inside the clearance between the upstream ejection guide 111 and the downstream ejection guide 112. The clearance between the upstream ejection guide 111 and the downstream ejection guide 112 is opened outside the side 101*a* of the printer housing 101 through the ejection opening 102 such that the end 120*d* of the basket cloth 120 can be inserted and removed into and from the clearance through the ejection opening 102. The basket cloth 120 is attached and detached to and from the downstream ejection guide 112 (the end 120*d* of the basket cloth 120 is held in the clearance) by the engagement and disengagement of an engaging portion and an engaged portion, which will be described later, between the second holder 140 and the downstream ejection guide 112.

The engaged portion, which will be described later, with the second holder 140 engaged therewith is attached to an upper roll cover 201 serving as a cover member (opening/closing member) that exposes the storing portion of a recording medium to the outside of the housing. Thus, the upper roll cover 201 can be opened and closed when the basket cloth 120 is placed at the first set position. This can permit changing of roll sheets without removing the basket cloth 120. Moreover, the basket cloth 120 at the first set position covers the front side of the printing apparatus 100, thereby preventing the curled sheet 1 from coming into contact with the roll cover 201 and causing scratches or ink smudges.

As illustrated in FIG. 4A, a width Wf of the basket cloth 120 in the width direction perpendicular to the ejection direction of the sheet 1 is larger than a maximum width Wp of the sheet 1 in the specifications of the printing apparatus, that is, the maximum width of the sheet 1 where an image can be recorded in the printing apparatus of the present example. At the first set position, even if a sheet having the maximum width in the specifications of the printing apparatus is ejected, the sheet 1 is not placed out of the basket cloth 120 in the width direction as illustrated in FIG. 1B. The width Wf of the basket cloth 120 is set inside user operation portions (handle portions) 141*b* on both ends, so that the width of the sheet 1 is necessarily set inside hook portions (hook-shaped portions) 141*a* serving as engaging portions.

Figure 5A:
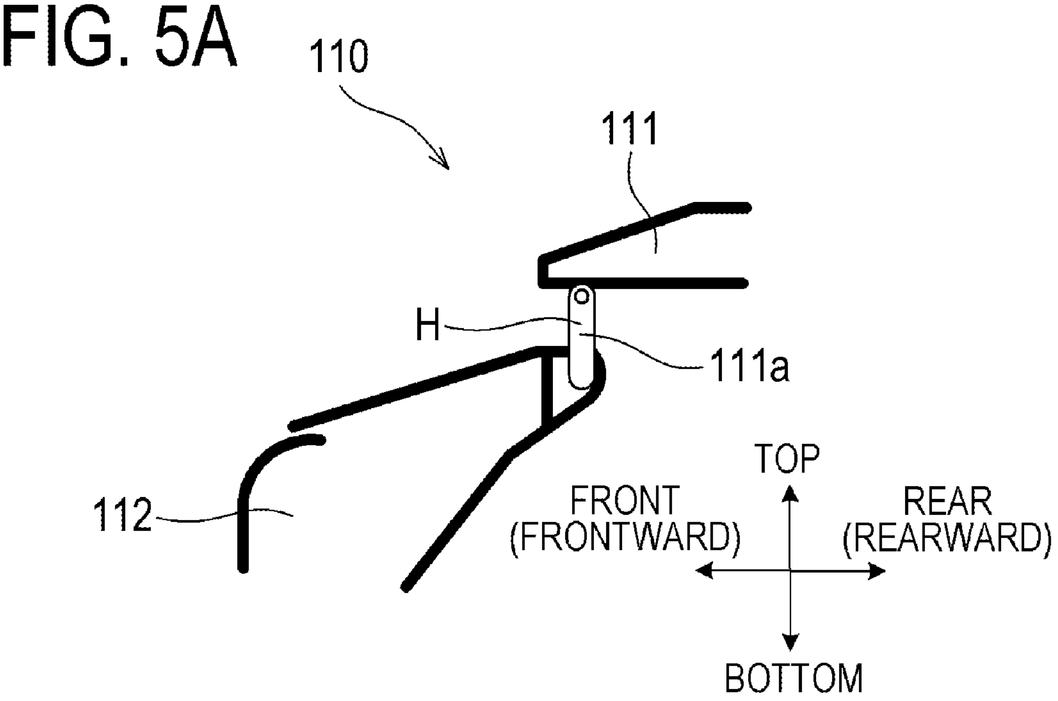
FIGS. 5A and 5B are explanatory drawings illustrating other configurations of upper and lower ejection guides according to Embodiment 1 of the present invention.
Figure 5B:
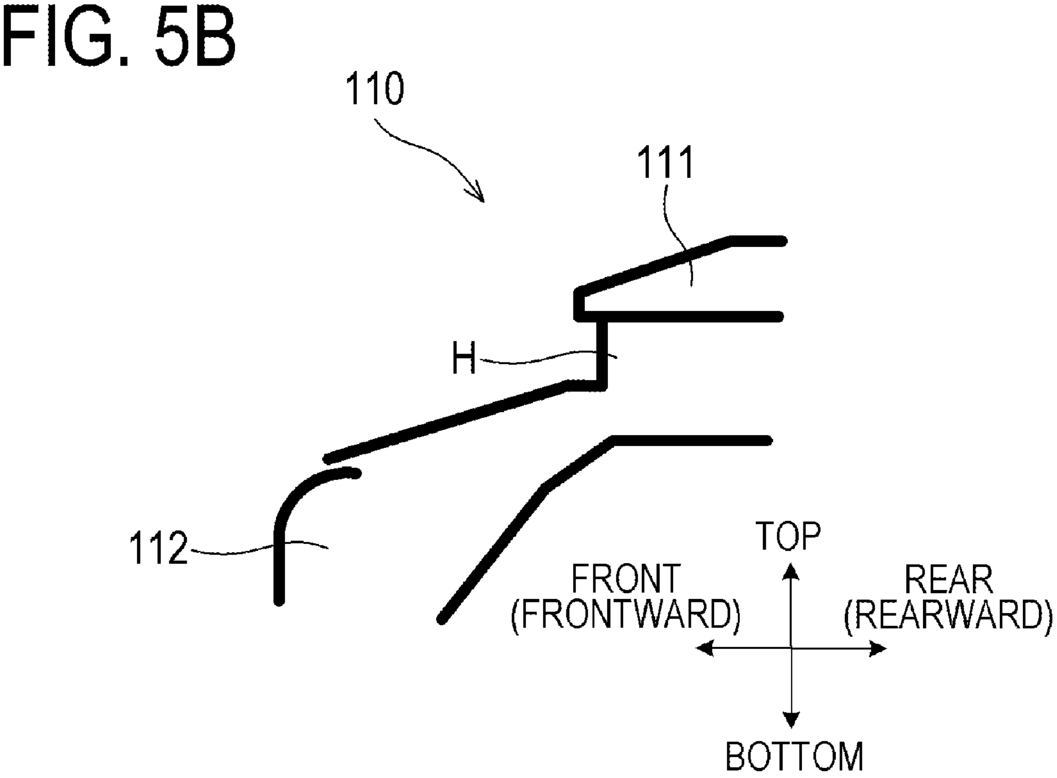

In this configuration, when the basket cloth 120 is not used, the upstream ejection guide 111 and the downstream ejection guide 112 are horizontally kept in an overlapping state even after the second holder 140 is removed, so that the ejection guides remain usable as ejection guides. The present invention is not limited to this configuration. FIGS. 5A and 5B are explanatory drawings illustrating other configurations of the upper and lower ejection guides. As illustrated in FIGS. 5A and 5B, it is not necessary to always open a space H where the second holder 140 is inserted. As illustrated in FIG. 5A, a shield 111*a* may be provided as a shield member projecting downward from the upstream ejection guide 111 so as to close the space H (clearance). The shield 111*a* may be pivotally urged by a spring urging force without being pressed to a sheet. In this case, for use in combination with the basket cloth 120, the shield 111*a* may be configured to be pressed by the basket cloth 120 attached to the downstream ejection guide 112 or the second holder 140 so as to pivot to a retraction position against a spring urging force when the basket cloth 120 is used. As illustrated in FIG. 5B, the upstream ejection guide 111 and the downstream ejection guide 112 may be combined and attached to the upper roll cover 201.

Figures 6A, 6B, 6C:
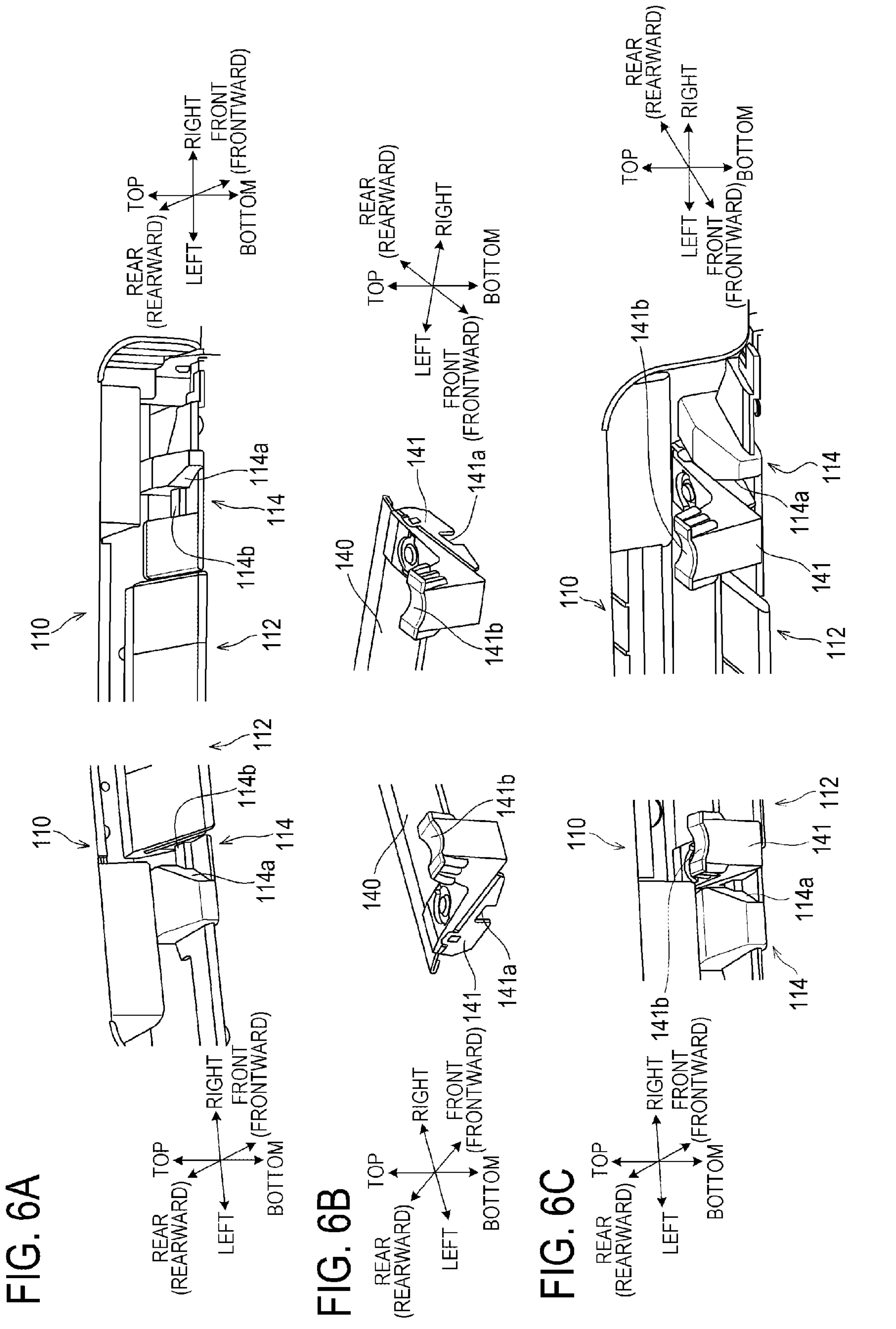
FIGS. 6A to 6C are explanatory drawings illustrating the attachment configuration of a basket according to Embodiment 1 of the present invention.

Referring to FIGS. 6A to 6C, the positioning members 141 that are provided on both ends of the second holder 140 and are engaged with the downstream ejection guide 112 will be specifically described below. FIG. 6A is a partial perspective view illustrating the engaging portions on the printing apparatus side, in the vicinity of the left and right ends of the downstream ejection guide 112 in the width direction. FIG. 6B is a partial perspective view illustrating the engaging portions on the second holder 140, in the vicinity of the left and right ends of the second holder 140 in the width direction. FIG. 6C is a partial perspective view illustrating that the second holder 140 is engaged with the engaging portions of the printing apparatus side in the vicinity of the left and right ends of the second holder 140 in the width direction. The positioning members 141 of the second holder 140 at the first set position are engaged with the printing apparatus 100 outside the maximum sheet width of the specifications, whereas engaged portions 114 of the downstream ejection guide 112 are disposed within the length of the downstream ejection guide 112 in the ejection direction (inside both ends in the ejection direction). This configuration offers excellent viewability and accessibility to a user. Furthermore, outside the engaged portions 114, inclined surfaces 114*a* formed in the ejection direction extend in the sheet width direction. The inclined surfaces 114*a* serves serve as guides for attaching the positioning members 141 by a user. The positioning member 141 has the hook portion (hook-shaped portion) 141*a* serving as an engaging portion for engagement with the engaged portion 114. The engaged portion 114 has a protruded portion 114*b* where the hook portion 141*a* can be engaged. The protruded portion 114*b* is provided at a lower position than the ejection guide surface of the engaged portion 114. The hook portion 141*a* is engaged with the protruded portion 114*b*, which is made of the same material as the hook portion 141*a*, at a lower position than the ejection guide surface of the engaged portion 114, thereby attaching the second holder 140 to the downstream ejection guide 112. The engagement between the positioning members 141 and the engaged portions 114 determines the positions of the second holder 140 in the sheet ejection direction and the vertical direction with respect to the downstream ejection guide 112.

Moreover, the user operation portion 141*b* serving as a handle portion for holding the second holder 140 (basket cloth 120) by a user during the attachment is provided on the hook portion 141*a*. The user operation portion 141*b* inside the ejection opening 102 of the housing 101 is exposed out of the clearance between the upstream ejection guide 111 and the downstream ejection guide 112. This facilitates the recognition of a hook position and prevents the second holder 140 from dropping from the space E between the upstream ejection guide 111 and the downstream ejection guide 112 into the printing apparatus 100. The total length of the second holder 140 and the positioning members 141 on both ends thereof is smaller than a distance between the inner surfaces of the drawer portion 150, which can be drawn at the lower portion of the printing apparatus, in the sheet width direction. Thus, when the basket cloth 120 is not used, the second holder 140 can be stored in the drawer portion like the first holder 130.

In the conventional apparatus configuration, the roll cover serves as a sheet-path surface and thus a sheet, which is easily curled, may roll up on the roll cover and bring a print surface (image recording surface) into contact with the roll cover. This may cause a scratch. Furthermore, in the conventional apparatus configuration, the attachment of the ejected-sheet storing portion (a form changed to a usable state) requires the opening and closing of the roll cover, which forces a user to perform an operation in addition to the attachment of the ejected-sheet storing portion. This may reduce the ease of operation. In contrast, the present embodiment includes the basket cloth covering the roll cover, thereby suppressing the occurrence of scratches on a recording medium to be ejected. Moreover, the ejected-sheet storing portion (basket) can be attached with the closed roll cover, that is, without the need for opening or closing the roll cover, thereby improving the ease of operation for a user.

Embodiment 2

Figure 7A:
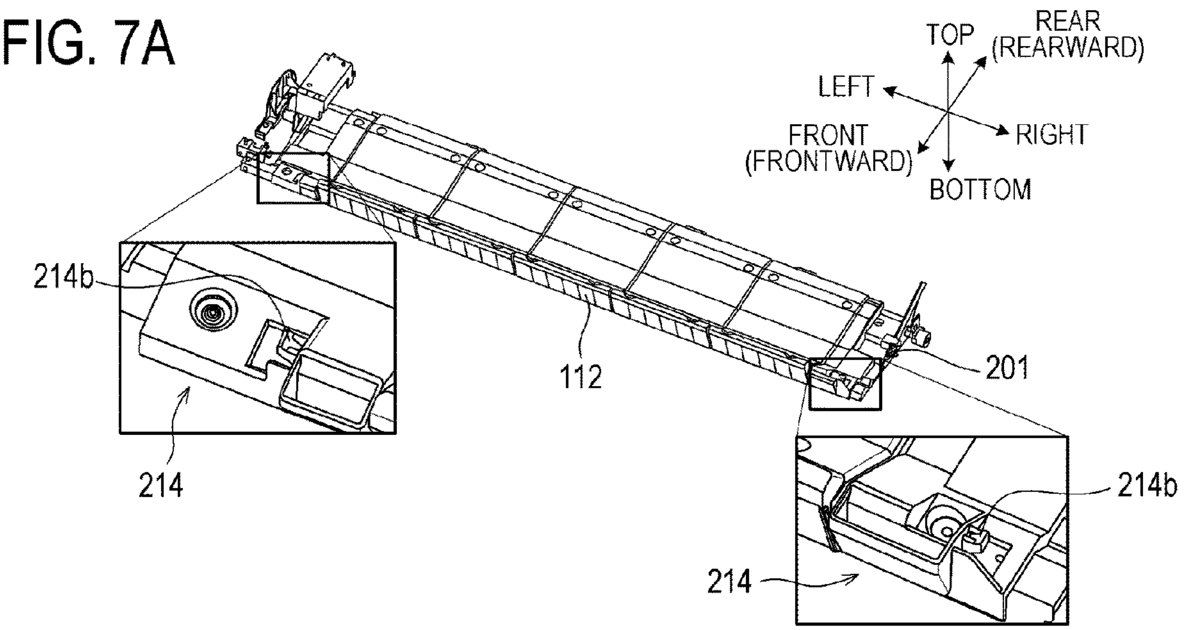
FIGS. 7A and 7B are explanatory drawings illustrating a configuration of a roll cover according to Embodiment 2 of the present invention.
Figure 7B:
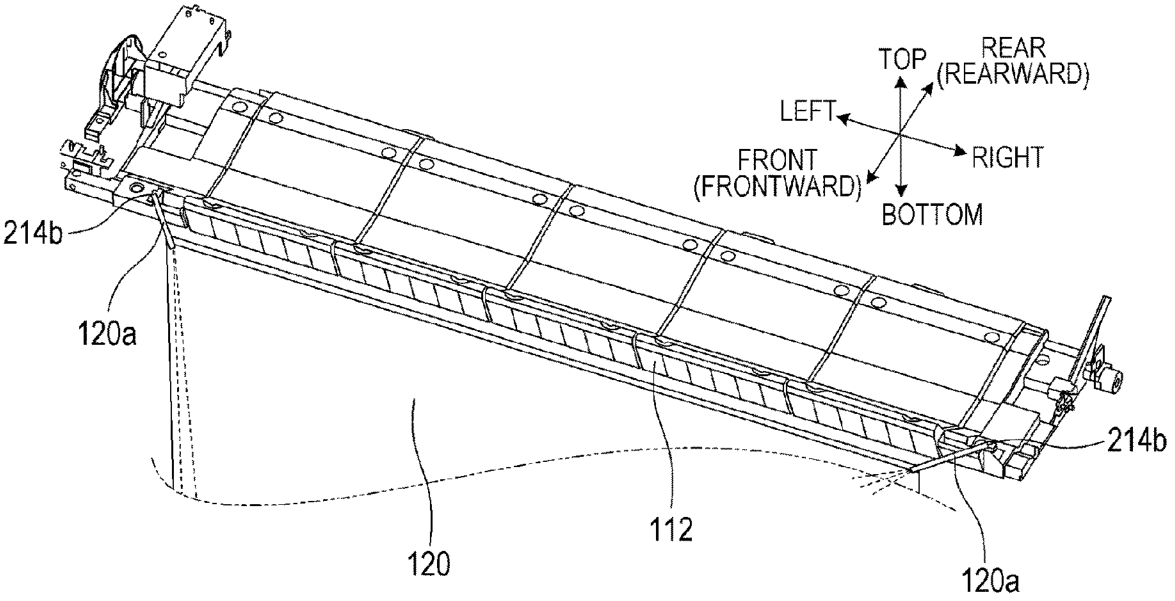

Referring to FIGS. 7A and 7B, Embodiment 2 will be described below. The same functions as those of Embodiment 1 are indicated by the same numbers. A downstream ejection guide 112 is attached to a roll cover 201. FIG. 7A is a perspective view of the opened roll cover 201 (the left and right ends are partially enlarged). The downstream ejection guide 112 has engaged portions 214 on both ends thereof in the sheet width direction and protruded portions 214*b* formed as hook-shaped portions. The protruded portions 214*b* are configured to be opened to the outside of a printing apparatus while the roll cover 201 is opened, thereby improving viewability. As illustrated in FIG. 7B, a loop cord (cord portion) 120*a* attached to both ends of a basket cloth 120 is hooked on the protruded portions 214*b* serving as hooks, thereby holding the basket cloth 120. FIG. 7B is a perspective view illustrating the basket cloth 120 attached to the roll cover 201 (the roll cover 201 is kept opened). When the roll cover 201 is closed, the first end 120*d* of the basket cloth 120 is held in a clearance between the upstream ejection guide 111 and the downstream ejection guide 112.

Figure 12B:
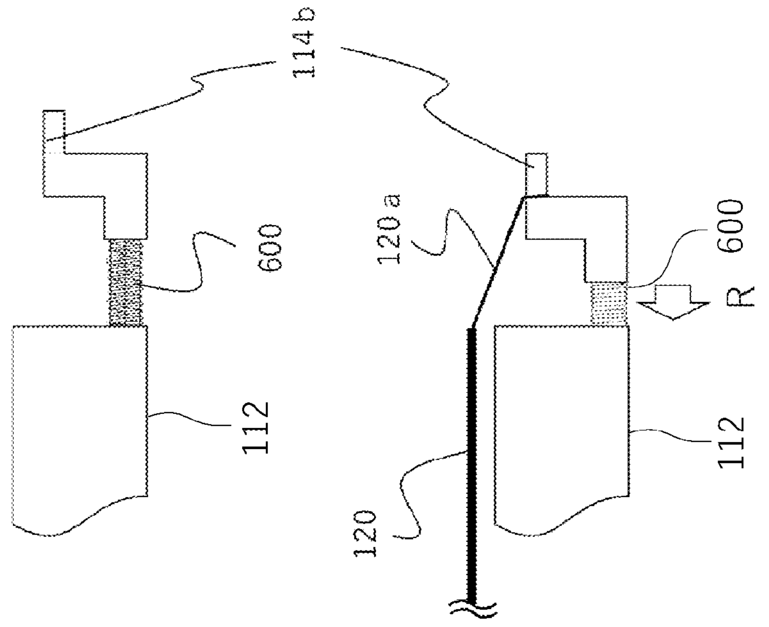
FIGS. 12A and 12B are explanatory drawings illustrating another configuration for attaching the basket according to Embodiment 2 of the present invention.
Figure 12A:
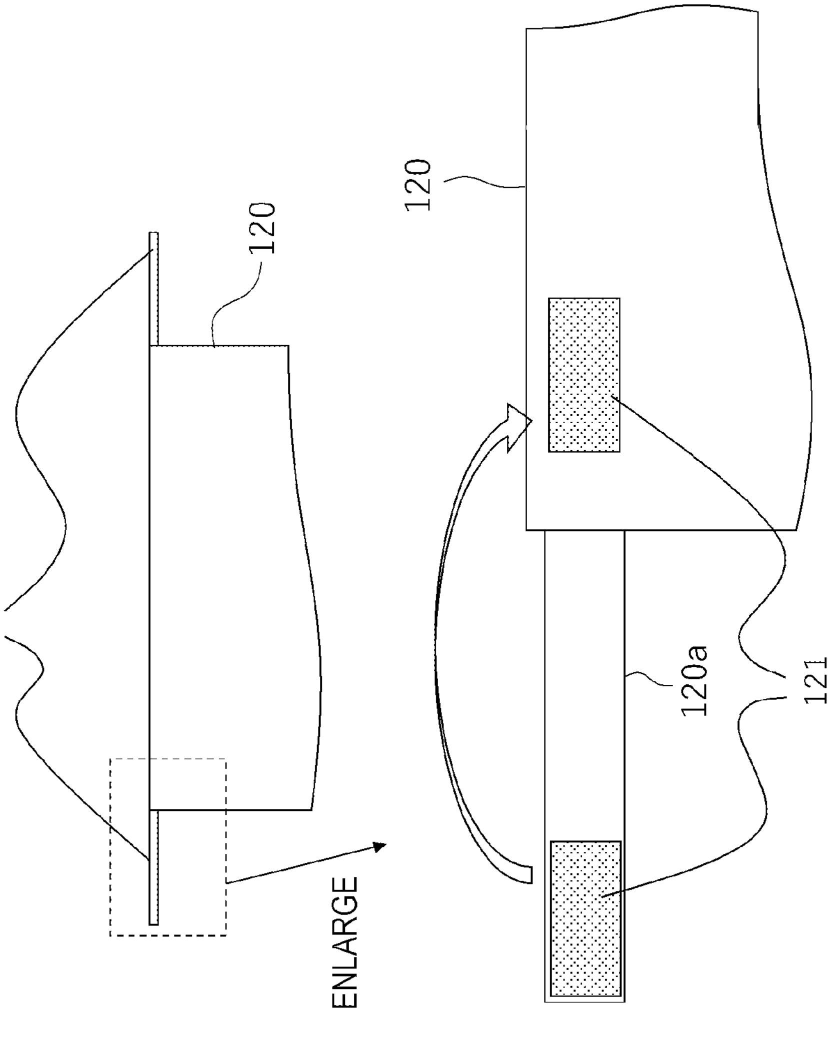

A distance between the hooked portions of the loop cord 120*a* on both ends of the basket cloth 120 is set shorter than a distance between faces for receiving the loop cord 120*a* at the protruded portions 214*b*. A tension is applied in the sheet width direction of the basket cloth 120, thereby preventing a sheet from being caught by slack at the central portion of the basket cloth 120. The present invention is not limited to this configuration. As illustrated in FIG. 12A, the loop cord 120*a* may have a hook and loop fastener 121 that can adjust a distance between cords. As illustrated in FIG. 12B, the protruded portion 214*b* may be urged by a spring 600 in the protruding direction, and a tension applied in the sheet width direction of the basket cloth 120 may be adjusted by the urging force.

Figure 8A:
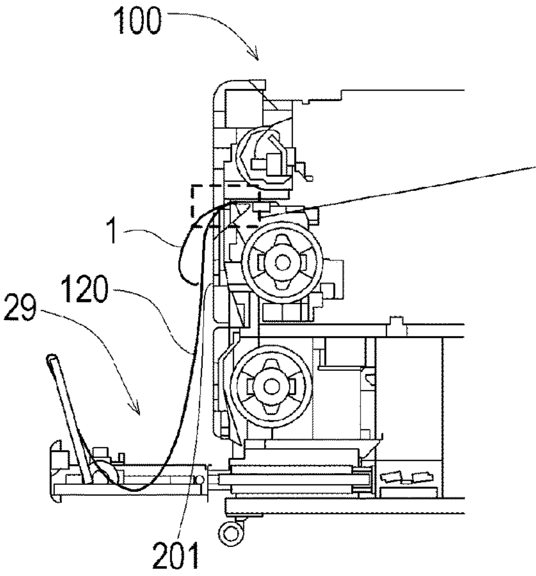
FIGS. 8A to 8C are explanatory drawings illustrating a configuration of a sheet storing device according to Embodiment 2 of the present invention.
Figure 8B:
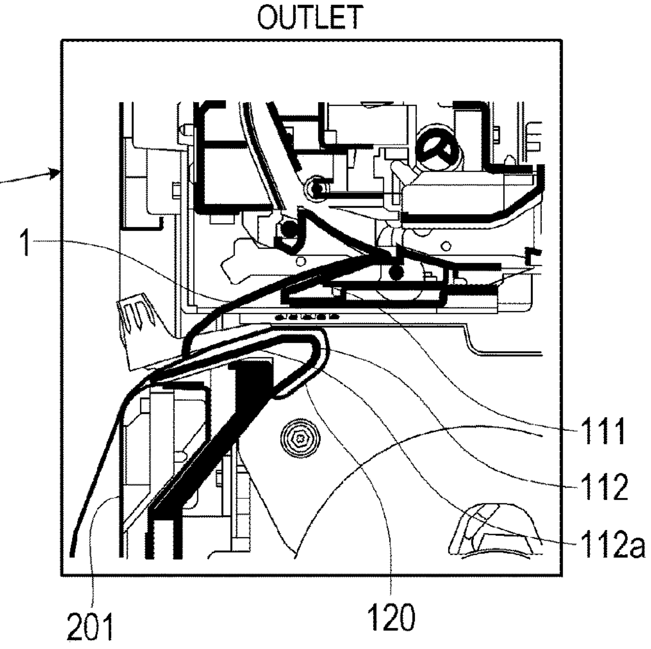
Figure 8C:
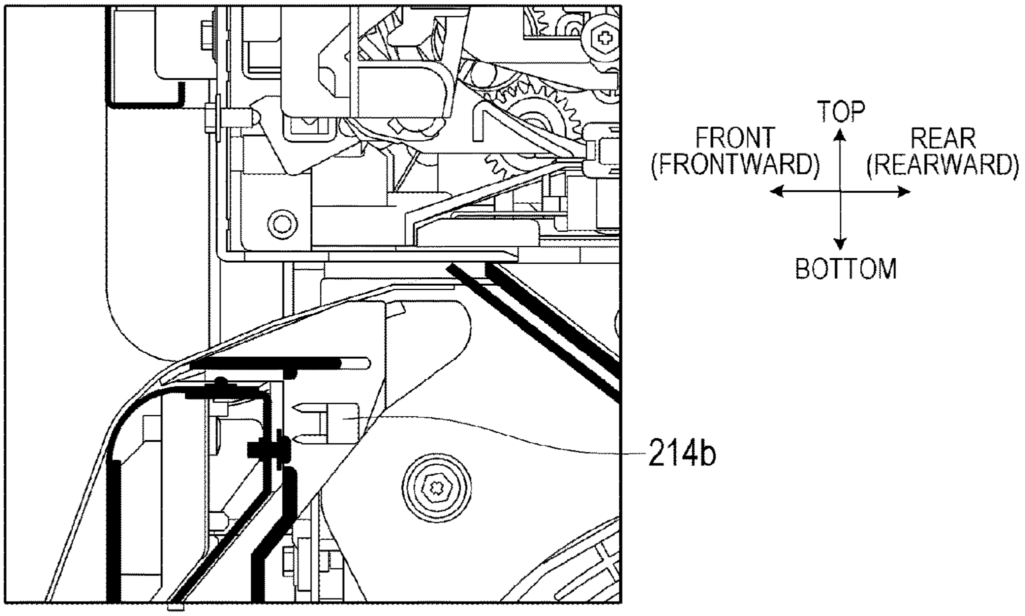

FIG. 8A is a partial cross-sectional view of a printing apparatus 100 in the process of ejecting a sheet 1 into a front ejected-sheet storing portion 29 according to Embodiment 2. FIGS. 8B and 8C are enlarged views around a sheet outlet in FIG. 8A. Hereinafter the configuration will be described mainly with reference to FIGS. 8B and 8C. As illustrated in the drawings, the protruded portions 214*b* of the engaged portions 214 are disposed inside an inclined surface 112*a* of the downstream ejection guide 112 in the printing apparatus 100 while the upper roll cover 201 is closed. Moreover, the loop cord 120*a* of the basket cloth 120 is attached to the protruded portions 214*b* serving as hooks, covering the sheet-path surface (inclined surface 112*a*) of the downstream ejection guide 112 with the basket cloth 120. Furthermore, a second set position where the basket cloth 120 and the upstream ejection guide 111 overlap each other in the horizontal direction is provided (a broken line in FIG. 8B). With this configuration, a sheet path for ejection is covered with the basket cloth 120 and thus scratches caused by a sheet curled into contact with a print surface can be prevented.

Figure 9B:
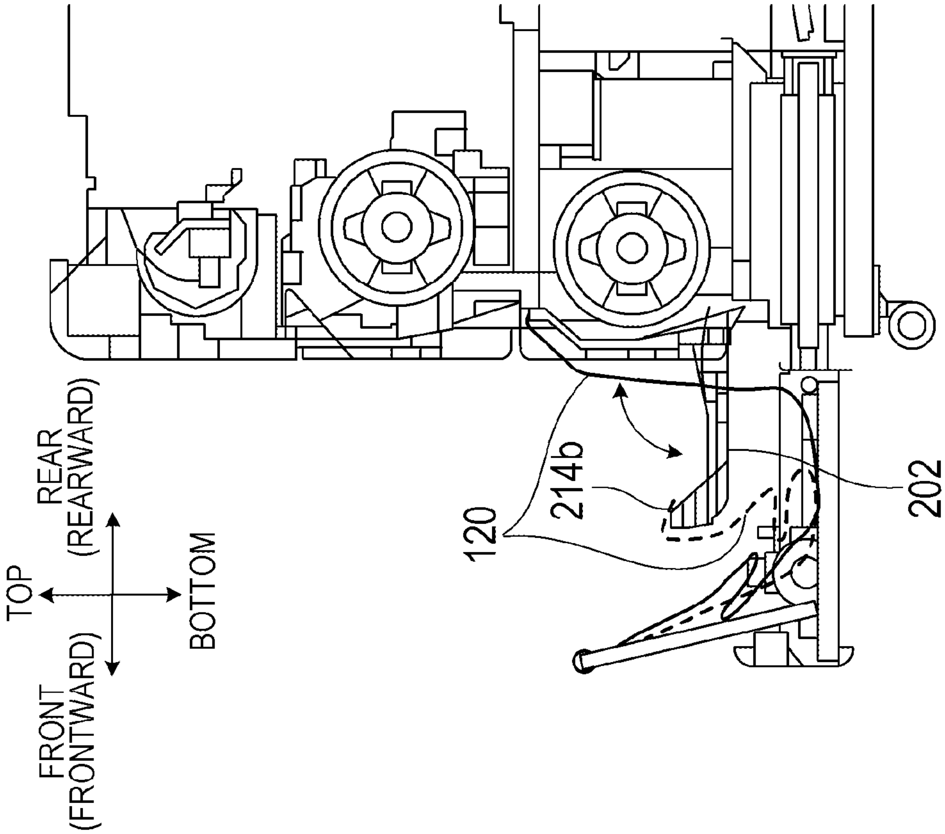
FIGS. 9A and 9B are explanatory drawings illustrating a configuration of the sheet storing device according to Embodiment 2 of the present invention.
Figure 9A:
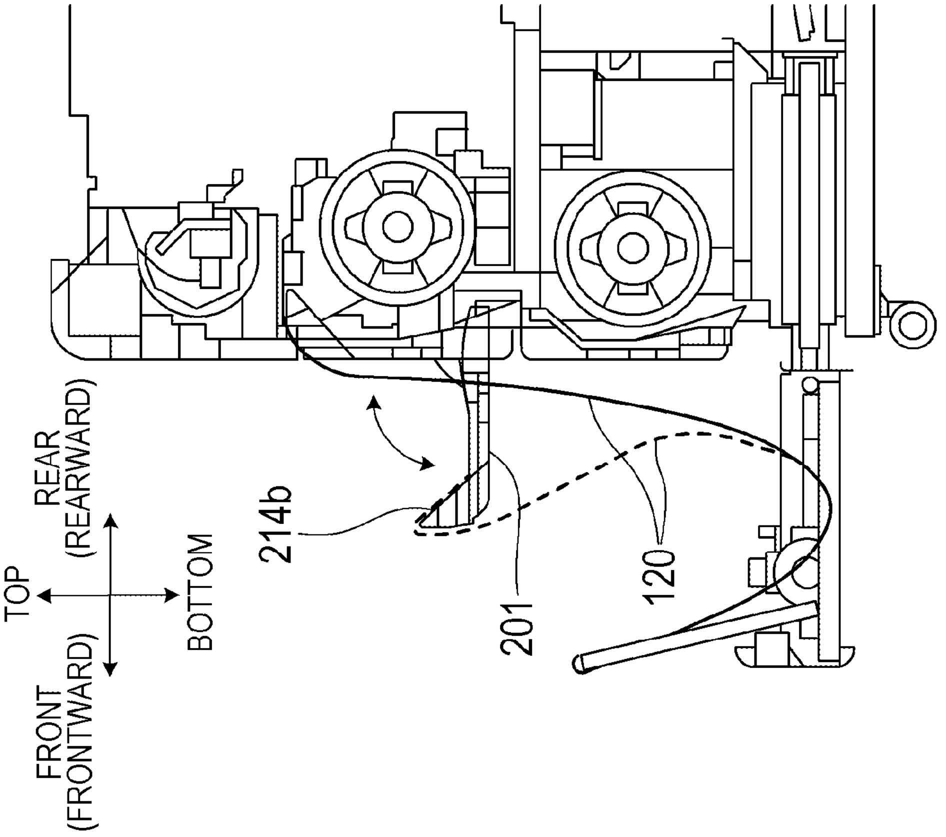

FIGS. 9A and 9B are schematic partial cross-sectional views illustrating a sheet storing device for the explanation of a state of the basket cloth 120 when rolls are changed in this configuration. As illustrated in FIG. 9A, if the basket cloth 120 is attached to the upper roll cover 201, the basket cloth 120 covers the upper roll cover 201 and a lower roll cover 202. Thus, this configuration effectively prevents the curly sheet 1 from coming into contact with the upper roll cover 201 and causing scratches or ink smudges. When rolls are changed, the upper roll can be changed while the basket cloth 120 is attached. As illustrated in FIG. 9B, if the basket cloth 120 is attached to the lower roll cover 202 serving as a second opening/closing member, the basket cloth 120 only covers the lower roll cover 202. Thus, this configuration is suitably used for less curly sheets. When the rolls are changed, the lower roll can be changed while the basket cloth 120 is attached. The upper roll is also accessible and thus the rolls can be properly used depending on the purpose of use.

Figures 10A, 10B:
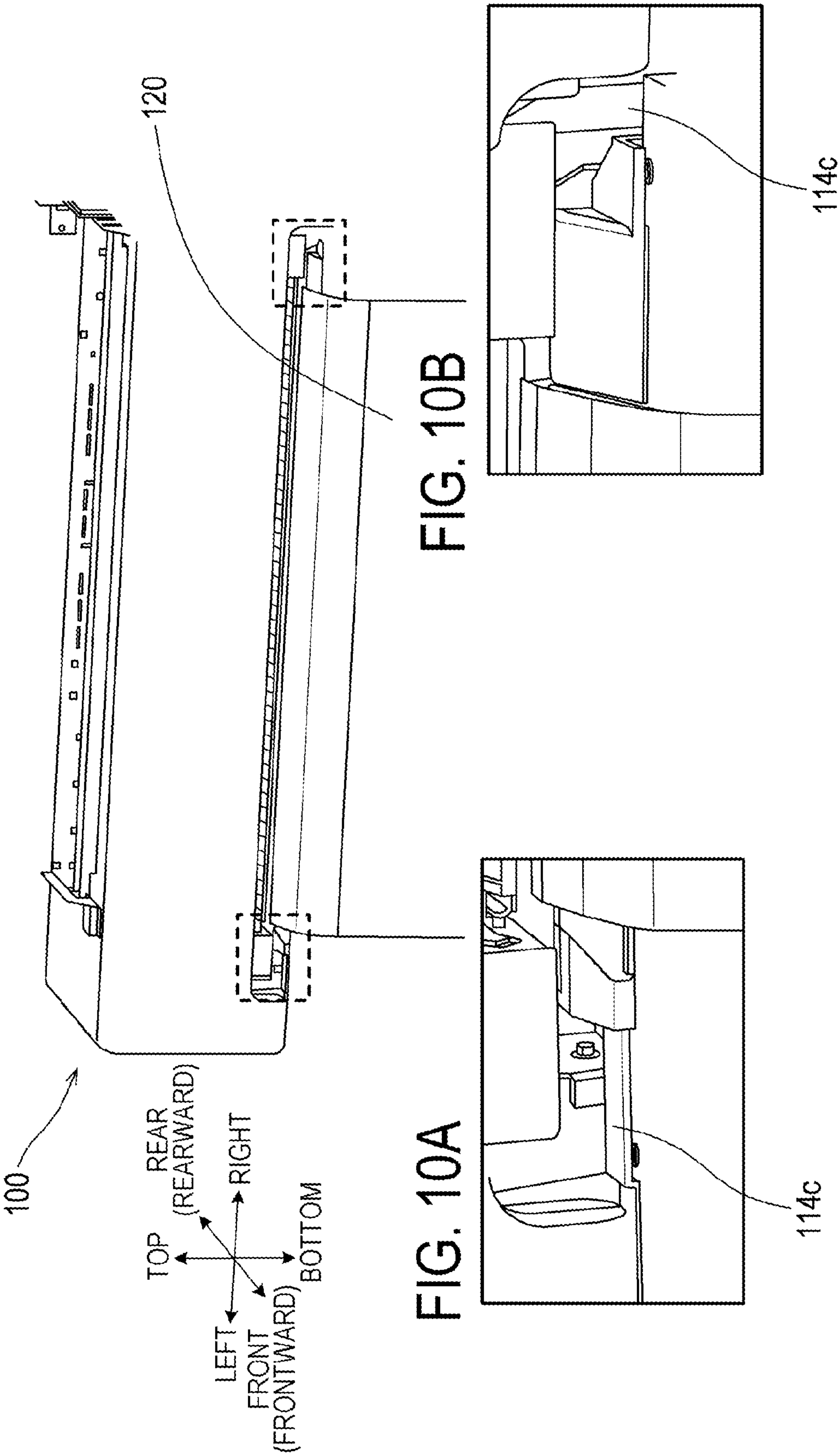
FIGS. 10A and 10B are explanatory drawings illustrating an operation when the roll cover is opened according to Embodiment 2 of the present invention.

Referring to FIGS. 10A and 10B, the configuration of the upper roll cover will be specifically described below. FIGS. 10A and 10B are explanatory drawings of an operation configuration when the upper roll cover is opened. FIGS. 10A and 10B are enlarged views illustrating both ends in the width direction (lateral direction). The lower roll cover has a similar configuration and thus the explanation thereof is omitted. First, as illustrated in FIGS. 10A and 10B, a depressed portion 114*c* is configured between the engaged portion 214 on each outer end in the sheet width direction of the basket cloth 120 and the printing apparatus 100. With this configuration, even when the basket cloth 120 is attached, the upper roll cover 201 can be opened with fingers inserted into the depressed portions 114*c*.

Figure 11A:
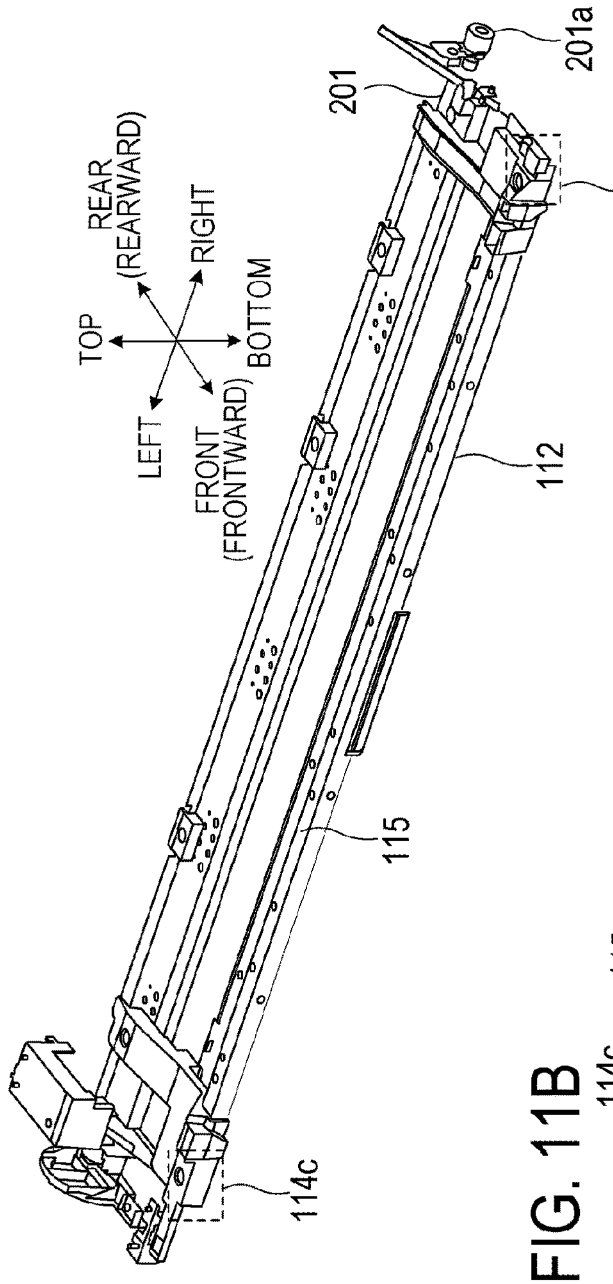
FIGS. 11A to 11C are explanatory drawings illustrating the lock configuration of the roll cover according to Embodiment 2 of the present invention.
Figure 11B:
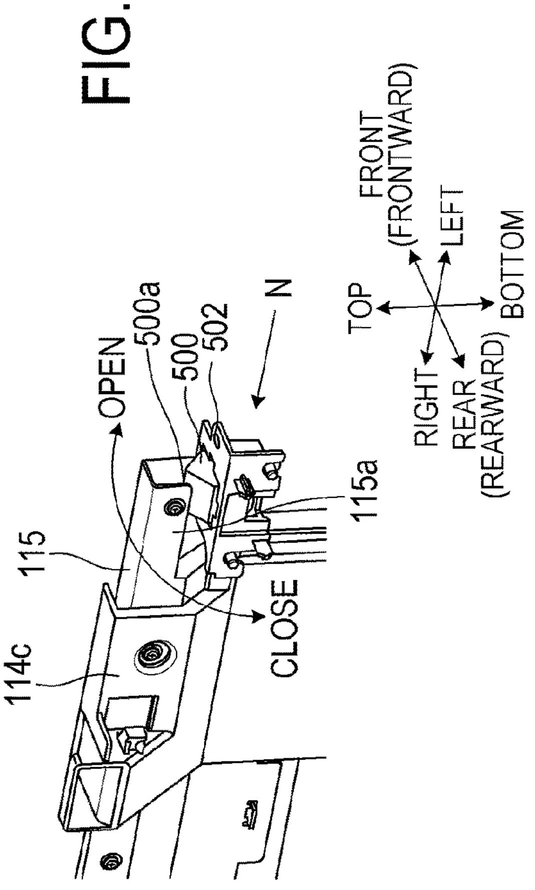

Referring to FIGS. 11A and 11B, the configuration of the upper roll cover 201 will be specifically described below. FIG. 11A is a partial perspective view illustrating the opened upper roll cover 201. FIG. 11B is a partial perspective view illustrating the closed upper roll cover 201 viewed from the left in the lateral direction (width direction) of FIG. 11A. In FIG. 11A, the upper roll cover 201 has a pivot center 201*a* (the opposed side is not illustrated). The depressed portion 114*c* is formed on one end opposite to the pivot center 201*a*, and a reinforcing beam 115 is attached in the sheet width direction. The reinforcing beam 115 is assembled to extend from one end to the other end in the width direction of the downstream ejection guide 112. As illustrated in FIG. 11B, the depressed portion 114*c* is formed in the area of the reinforcing beam 115 and thus keeps stiffness in this configuration, so that the upper roll cover 201 can be opened with fingers.

Figure 11C:
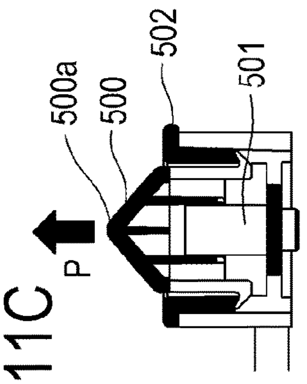

In FIG. 11B, a lock holder 502 attached into the printing apparatus 100 and a lock member 500 attached to the lock holder 502 are opposed to the pivot center 201*a* of the upper roll cover 201. These components lock the upper roll cover 201. The lock configuration is specifically illustrated in FIG. 11C. The lock member 500 is urged in the direction of an arrow P by a lock spring 501 assembled into the lock holder 502. Thus, the upper roll cover 201 is pivoted over a top 500*a* of the lock member in the direction of an arrow (close) in FIG. 11B, the top 500*a* being disposed in the area of a bent portion 115*a* of the reinforcing beam, thereby locking the upper roll cover 201. With this configuration, the upper roll cover 201 can be directly locked by the bent portion 115*a* of the reinforcing beam and thus can be opened with fingers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166128, filed on Sep. 30, 2020, which is hereby incorporated by reference herein in its entirety.

What is claimed is:

1. A recording apparatus comprising:

a set portion configured to set a recording medium wound into a roll sheet;

a recording portion configured to record an image on the recording medium fed from the roll sheet set at the set portion;

a guide configured to guide the recording medium recorded by the recording portion in a discharging direction;

a receiving member having a first end and a second end and configured to receive the recording medium guided by the guide;

a holding portion provided between the guide and the set portion with respect to a vertical direction and configured to hold the first end side of the receiving member; and a sliding portion configured to slide between a first position in which the receiving member can receive the recording medium by moving the second end side of the receiving member while the holding portion holds the first end side of the receiving member, and a second position in which the receiving member cannot receive the recording medium and at least a part of the receiving member is housed in an apparatus main body.

2. The recording apparatus according to claim 1, wherein the receiving member is a flexible sheet-like member.

3. The recording apparatus according to claim 1, wherein at least a part of the guide includes an inclined surface inclined downward toward a downstream side in the discharging direction.

4. The recording apparatus according to claim 1, wherein the first end side of the receiving member overlaps with the guide when viewed in the vertical direction.

5. The recording apparatus according to claim 1, wherein the sliding portion slides along a rail.

6. The recording apparatus according to claim 1, wherein a width of the receiving member in a width direction of the recording medium is wider than a maximum width of the roll sheet set at the set portion.

7. The recording apparatus according to claim 1, wherein the holding portion is wrapped with the receiving member at the first end side.

8. The recording apparatus according to claim 1, further comprising a second holding portion configured to hold the second end side of the receiving member, wherein the second holding portion is moved by the sliding portion.

9. The recording apparatus according to claim 8, wherein a position of the second holding portion is lower than a position of the holding portion in the vertical direction.

10. The recording apparatus according to claim 1, further comprising a second set portion provided below the set portion and configured to set a recording medium wound into a roll sheet.

11. The recording apparatus according to claim 1, wherein in a case that the sliding portion is in the first position, the second end of the receiving member is disposed downstream of the first end of the receiving member with respect to the discharging direction.

12. The recording apparatus according to claim 1, wherein the set portion is disposed below the guide in the vertical direction.

* * * * *